United States Patent [19]

Dane

[11] Patent Number: 5,135,195

[45] Date of Patent: Aug. 4, 1992

[54] BEVERAGE RECEPTACLE HOLDER

[76] Inventor: Billie J. Dane, 924 Golf Club Rd., Burneyville, Okla. 73430

[21] Appl. No.: 691,482

[22] Filed: Apr. 25, 1991

[51] Int. Cl.$^5$ .............................................. A47K 1/08
[52] U.S. Cl. ................. 248/311.2; 248/310; 248/314
[58] Field of Search .................. 248/311.2, 313, 314, 248/310, 213.2

[56] References Cited

U.S. PATENT DOCUMENTS

| | | | |
|---|---|---|---|
| 3,306,566 | 2/1967 | Paulson | 248/314 |
| 4,596,370 | 6/1986 | Adkins | 248/311.2 |
| 4,749,162 | 6/1988 | Wanzor | 248/311.2 |

Primary Examiner—Robert W. Gibson, Jr.
Attorney, Agent, or Firm—Harry Wolin

[57] ABSTRACT

A beverage receptacle holder comprises a substantially circular first portion having a first end and a second end and a substantially circular second portion having a first and contiguous to the second end of the first portion and a second end. The first portion is of a first diameter while the second portion is of a second diameter which is larger than the first diameter. This enables the beverage receptacle holder to securely hold cups, glasses, cans, mugs and other beverage receptacles of various sizes.

20 Claims, 1 Drawing Sheet

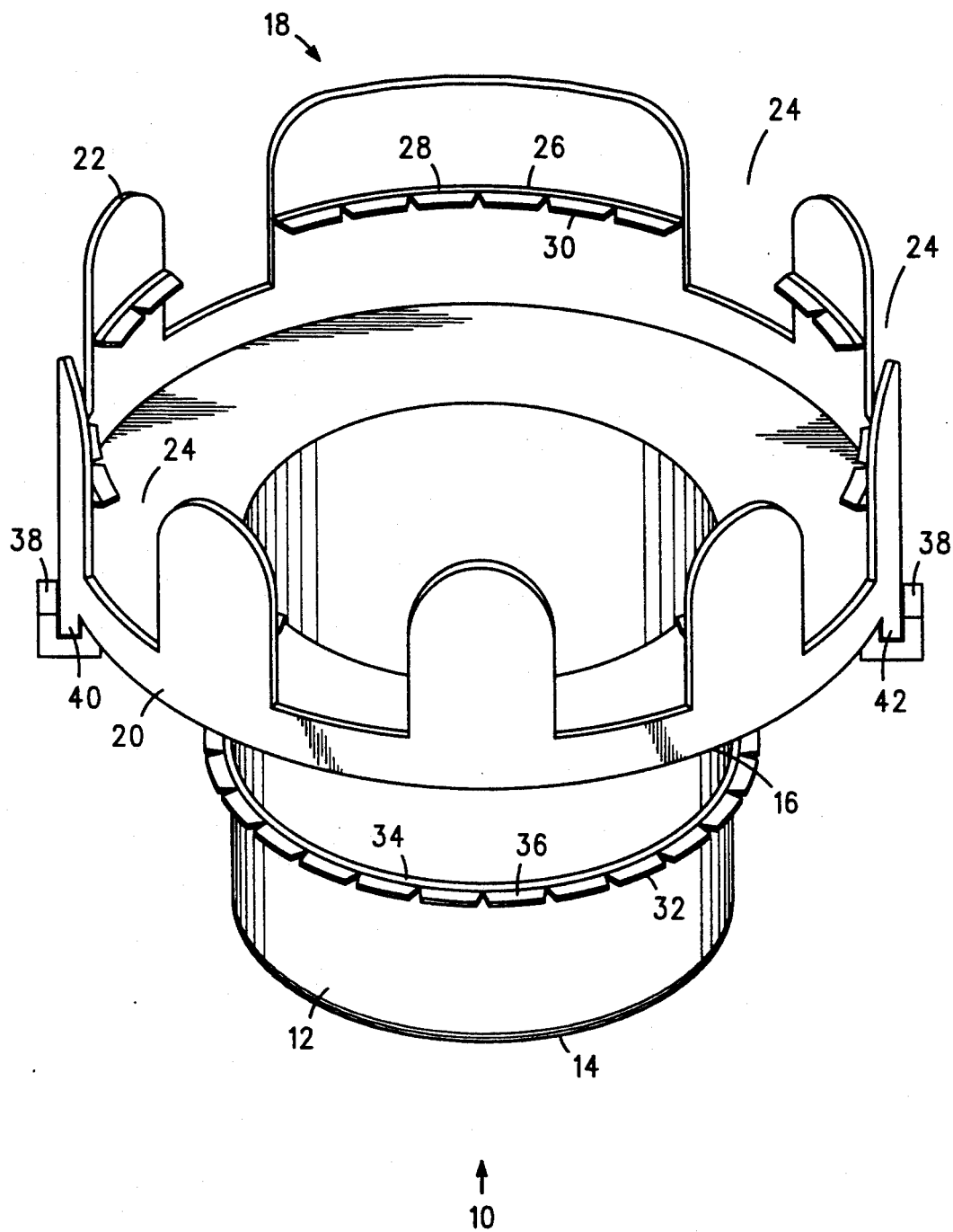

BEVERAGE RECEPTACLE HOLDER

FIELD OF THE INVENTION

This invention relates, in general to, beverage receptacle holders and more particularly to a beverage receptacle holder capable of securely holding cups, glasses, cans, mugs and the like of differing sizes.

BACKGROUND OF THE INVENTION

Autos, boats, golf carts and other vehicles commonly include beverage receptacle holders to hold receptacles such as cups, glasses, cans, mugs and the like. It is also well known to dispose beverage receptacle holders in patio furniture and other articles. These beverage receptacle holders are often disposed in a plastic console, wooden tray or similar article. A very common beverage receptacle holder is merely a cylindrically configured tube type structure having a uniform diameter along the length of the cylinder. Although this type of holder works very well for beverage receptacles having a uniform diameter only slightly smaller than the diameter of the holder, they do not adequately hold beverage receptacles having diameters much smaller than the holder, beverage receptacles not having a uniform diameter and will not hold receptacles having diameters larger than the holder.

Uniform cylindrical beverage receptacle holders typically do not adequately hold a mug or the like having a handle protruding therefrom because there is no place to put the handle. Another shortcoming of this type beverage receptacle holder is that the height of the holder is often not high enough to hold a tumbler or other relatively tall cup. The aforementioned problems often cause beverages to spill when a vehicle encounters a bump or is otherwise subjected to uneven driving conditions.

In view of the above, it would be highly desirable to have a beverage receptacle holder that will securely hold beverage receptacles of various sizes and configurations.

SUMMARY OF THE INVENTION

A beverage receptacle holder in accordance with the present invention comprises a substantially circular first portion having a first end and a second end and a substantially circular second portion having a first end contiguous to the second end of the first portion and a second end. The diameter of the first portion is smaller than the diameter of the second portion which allows beverage receptacles of various sizes to be securely held. Openings may be disposed in the second portion for handles from mugs and the like to be disposed. The beverage receptacle holder may be formed directly in vehicles and other articles or may be a separate holder that will fit into most pre-existing beverage holders.

BRIEF DESCRIPTION OF THE DRAWING

The single FIGURE is a perspective/view of a beverage receptacle holder in accordance with the present invention.

DETAILED DESCRIPTION OF THE PREFERRED EMBODIMENT

The single FIGURE is a perspective view of a beverage receptacle holder 10 in accordance with the present invention. Holder 10 includes a first portion 12 having a first end 14 and a second end 16. First end 14 of first portion 12 is shown to be rounded or chamfered. This allows holder 10 to be easily placed in an existing holder or the like. Holder 10 further includes a second portion 18 having a first end 20 contiguous to second end 16 of first portion 12 and a second end 22. Holder 10 is fabricated using a rigid material such as a plastic. Holder 10 specifically may be fabricated by molding a molten plastic such as high-impact polystyrene (HIPS) that becomes rigid when solidified.

The diameter of second portion 18 is appreciably larger than the diameter of first portion 12. The particular diameters of first portion 12 and second portion 18 are not critical although they must be able to securely hold common size cups, glasses, cans, mugs and other receptacles. A specific holder 10 will include first portion 12 having an inside diameter on the order of 2 19/32 inches and second portion 18 having an inside diameter on the order of 3 7/16 inches. This particular embodiment of the present invention would be such that first portion 12 would accept standard size soda cans and the like while second portion 18 would be such that it would accept larger mugs, cups and other receptacles. The height of holder 10 must be high enough so that the receptacles placed in holder 10 will not easily tip and spill. For the specific holder 10 having dimensions set forth above, the total height would be on the order of 3 13/32 inches with first portion 12 having a height on the order of 1 5/32 inches and second portion 18 having a height on the order of 2¼ inches.

A plurality of openings 24 are disposed in second end 22 of second portion 18. Openings 24 allow a mug or other beverage receptacle having a handle or other protruding member to be placed in holder 10. The number of openings 24 disposed in second portion 22 is not critical. Further, the size of openings 24 is not critical although they should be sufficient to accept common mug handles and the like. The specific holder 10 for which dimensions are being given herein includes openings 24 having a width on the order of ⅜ inch.

As shown herein, the sections of second end 22 of second portion 18 disposed between openings 24 are rounded. This is so that a mug handle or the like may be easily placed in an opening 24. This is especially important when holder 10 is utilized in a vehicle. Rounded second ends 22 allow a driver to easily place a mug handle or the like in an opening 24 without demanding significant attention.

Stabilizing tape 26 is shown disposed on sections of the inner surface of second portion 18. Stabilizing tape 26 serves to securely hold beverage receptacles having diameters somewhat smaller than the diameter of second portion 18. Stabilizing tape 26 comprises a pliable material that may be easily deformed to adjust to the specific beverage receptacle to be held. A material such as polypropylene or neoprene will work extremely well. As shown, stabilizing tape 26 includes a base portion 28 having a plurality of serrated portions 30 extending therefrom. stabilizing tape 26 may be either permanently formed in holder 10 or may be removable so that it may be removed if not necessary. A velcro tape may be employed with a removable stabilizing tape 26. Although stabilizing tape 26 is specifically shown herein, it should be understood that numerous types of stabilizing configurations may be employed.

A stabilizing ring 32 is shown disposed about the outer surface of first portion 12. Stabilizing ring 32 may be slipped on over first end 14 of first portion 12 similar to a rubber band. It may also be removed if not needed to stabilize holder 10. Stabilizing ring 32 is also pliable so that it may be deformed and may be made of polypropylene, neoprene or another similar material. Stabilizing ring 32 also includes a base portion 34 and a plurality of serrated portions 36 extending therefrom. Stabilizing ring 32 stabilizes holder 10 when it is placed inside existing holders, compartments or the like and allows holder 10 to be securely disposed therein. It should be understood that stabilizing ring 32 is only necessary when the present invention is employed as a separate holder to be disposed in an existing beverage receptacle holder or the like. If the present invention is fabricated as an integral part of an automobile console or similar article, stabilizing ring 32 is not necessary. Again, although a specific stabilizing ring 32 is shown herein, it should be understood that many other stabilizing configurations may be employed.

It should be understood that a holder 10 in accordance with the present invention may be employed as a free-standing beverage receptacle holder. By disposing holder 10 in an auxiliary base or manufacturing a base as an integral part of holder 10, the present invention may be employed without being formed in a console or the like and without being disposed in an existing beverage receptacle holder or the like. Further, a holder 10 may be used with other securing means such as suction cups or velcro strips so that it may be secured to various articles.

Levelers 38 are disposed on first end 20 of second portion 18. Levelers 38 level holder 10 when it is placed in an existing holder or the like having an uneven surface. Levelers 38 comprise a protruding portion 40 that is preferably formed as a part of second portion 18. A pliable spacer 42 made of polypropylene, neoprene or a similar material is disposed over protruding portions 40. Pliable spacers 42 may be adjusted so that holder 10 may be leveled in accordance with specific uneven surfaces. Again, levelers 38 are only necessary when holder 10 is employed as a separate holder to be disposed in an existing holder. It should be understood that levelers 38 may be of various configurations other than that specifically depicted herein.

Thus, it is apparent that there has been provided, in accordance with the invention, an improved beverage receptacle holder. While specific embodiments of this invention have been shown and described, further modifications and improvements will occur to those of skill in the art. It is desired that it be understood, therefore, that this invention is not limited to the particular forms shown and it is intended in the appended claims to cover all modifications which do not depart from the spirit and scope of this invention.

I claim:

1. A beverage receptacle holder comprising:
   a substantially circular first receiving portion having a first end and a second end;
   a substantially circular second receiving portion having a first end contiguous to said second end of said first portion and a second end; and
   wherein said first portion is of a first diameter and said second portion is of a second diameter being larger than said first diameter to receive a beverage receptacle of a diameter larger than said first diameter.

2. The beverage receptacle holder of claim 1 having stabilizing means disposed on an outer surface of the first portion.

3. The beverage receptacle holder of claim 1 having stabilizing means disposed on an inner surface of the second portion.

4. The beverage receptacle holder of claim 1 wherein leveling means are disposed on the first end of the second portion.

5. The beverage receptacle holder of claim 1 wherein the first end of the first portion is rounded or chamfered.

6. The beverage receptacle holder of claim 1 having at least one opening in the second end of the second portion.

7. The beverage receptacle holder of claim 6 wherein the sections of the second end of the second portion adjacent the at least one opening are rounded.

8. A rigid beverage receptacle holder comprising:
   a substantially circular first receiving portion of a first diameter having a first end and a second end;
   a substantially circular second receiving portion of a second diameter being larger than said first diameter, said second portion having a first end contiguous to said second end of said first portion and a second end, said second portion to receive a beverage receptacle of a diameter larger than said first diameter; and
   at least one opening in the second end of the second portion.

9. The beverage receptacle holder of claim 8 wherein the sections of the second end of the second portion adjacent the at least one opening are rounded.

10. The beverage receptacle holder of claim 8 wherein pliable stabilizing means are disposed on an outer surface of the first portion.

11. The beverage receptacle holder of claim 8 wherein pliable stabilizing means are disposed on an inner surface of the second portion.

12. The beverage receptacle holder of claim 8 wherein leveling means are disposed on the first end of the second portion.

13. The beverage receptacle holder of claim 8 wherein the first end of the first portion is rounded.

14. A rigid plastic beverage receptacle holder comprising:
   a substantially circular first receiving portion of a first diameter having a first end and a second end;
   a substantially circular second receiving portion of a second diameter being larger than said first diameter, said second portion having a first end contiguous to said second end of said first portion and a second end, said second portion to receive a beverage receptacle of a diameter larger than said first diameter;
   at least one opening in the second end of the second portion; and
   flexible stabilizing means disposed on an inner surface of the second portion.

15. The beverage receptacle holder of claim 14 wherein the sections of the second end of the second portion adjacent the at least one opening are rounded.

16. The beverage receptacle holder of claim 15 wherein pliable stabilizing means are disposed on an outer surface of the first portion.

17. The beverage receptacle holder of claim 15 wherein leveling means are disposed on the first end of the second portion.

18. The beverage receptacle holder of claim 15 wherein the first end of the first portion is rounded.

19. The beverage receptacle holder of claim 15 wherein the first and second portions comprise high impact polystyrene and flexible stabilizing means comprise polypropylene or neoprene.

20. The beverage receptacle holder of claim 16 wherein flexible stabilizing means disposed on an inner surface of the second portion and flexible stabilizing means disposed on an outer surface of the first portion comprise polypropylene or neoprene and the first and second portions comprise high impact polystyrene.

* * * * *